United States Patent [19]

McIntyre

[11] Patent Number: 4,996,091

[45] Date of Patent: Feb. 26, 1991

[54] PRODUCT COMPRISING SUBSTRATE BEARING CONTINUOUS EXTRUDED FIBER FORMING RANDOM CRISSCROSS PATTERN LAYER

[75] Inventor: Frederic S. McIntyre, Wellesley, Mass.

[73] Assignee: Acumeter Laboratories, Inc., Marlboro, Mass.

[21] Appl. No.: 278,712

[22] Filed: Dec. 2, 1988

Related U.S. Application Data

[60] Division of Ser. No. 198,689, May 24, 1988, Pat. No. 4,891,249, which is a continuation of Ser. No. 36,254, May 26, 1987, abandoned.

[51] Int. Cl.[5] .......... B32B 5/08

[52] U.S. Cl. .......... 428/113; 428/284; 428/286; 428/296; 428/297; 428/343; 428/354; 428/355; 428/913; 604/365

[58] Field of Search .......... 428/113, 343, 355, 354, 428/913, 296, 284, 286, 297; 604/365

[56] References Cited

U.S. PATENT DOCUMENTS

| | | | |
|---|---|---|---|
| 3,318,746 | 5/1967 | Langlois | 156/167 |
| 3,341,394 | 9/1967 | Kinney | 161/72 |
| 3,442,751 | 5/1969 | Langlois | 161/72 |
| 3,546,062 | 12/1970 | Herrman | 161/169 |
| 3,553,064 | 1/1971 | Wideman | 428/113 |
| 3,553,065 | 1/1971 | Stumpf et al. | 428/113 |
| 3,676,242 | 7/1972 | Prentice | 156/62.4 |
| 3,687,791 | 8/1972 | Germain | 156/549 |
| 3,791,911 | 2/1974 | Yaeger et al. | 428/113 |
| 3,821,062 | 6/1974 | Henderson | 428/113 |
| 3,878,014 | 4/1975 | Melead | 156/167 |
| 3,904,455 | 9/1975 | Goldman | 156/62.4 |
| 3,940,302 | 2/1976 | Matthews et al. | 156/167 |
| 3,949,130 | 4/1976 | Sabee et al. | 428/296 |
| 4,013,816 | 3/1977 | Sabee et al. | 428/296 |
| 4,091,140 | 5/1978 | Harmon | 428/288 |
| 4,133,310 | 1/1979 | Lloyd et al. | 428/343 |
| 4,229,472 | 10/1980 | Suskind et al. | 428/113 |
| 4,666,542 | 5/1987 | De Jonckheere | 156/164 |
| 4,722,857 | 2/1988 | Tomeoka et al. | 428/113 |
| 4,753,843 | 6/1988 | Cook et al. | 428/286 |

*Primary Examiner*—James J. Bell

*Attorney, Agent, or Firm*—Rines and Rines, Shapiro and Shapiro

[57] ABSTRACT

The invention relates to an apparatus and method of controlling the generation of somewhat-to-highly viscous fluid fibers, droplets and combinations of the same, including hot melt adhesive and other fluids, that comprises, spraying a stream of such pressurized fluid through a fine orifice and along a predetermined direction in free flight, and simultaneously funneling a cone of pressurized air symmetrically about and against said stream, intersecting the same in its free flight below said orifice to control the nature, dimensions and pattern of the resulting fluid coating on surfaces disposed therebelow. Supplemental air controls are also providable for contouring and other effects.

10 Claims, 8 Drawing Sheets

PRODUCT COMPRISING SUBSTRATE BEARING CONTINUOUS EXTRUDED FIBER FORMING RANDOM CRISSCROSS PATTERN LAYER

This is a division of application Ser. No. 198,689, filed May 24, 1988 U.S. Pat. No. 4,891,249, which is a continuation of application Ser. No. 036,254, filed May 26, 1987 (abandoned).

The present invention relates to methods of and apparatus for depositing on surfaces highly viscous and lower viscosity fluids, including but not limited to hot melt fluids, for such purposes as providing adhesive layers or other coatjngs on moving webs or other substrate surfaces, being more particularly directed to the spraying of such fluids and the control of the same in terms of the nature of the spray particles, the extent of the spray and the contour, particularly in intermittent operation, through utilizing air jets and related parameters that convert fluid spray droplets into thin fibers or filaments of fluid, but with flexibility for generating also combinations of fibers or filaments and droplets or globules in various proportions and for various purposes.

There are commercial applications, such as in disposable baby diapers and feminine napkins and the like, where adhesive or other coatings are to be applied for laminating one or more of non-woven porous sheets and tissues, and polyethylene or similar impermeable or permeable sheets, pulp fluff and the like to one another or to other products, and wherein it is highly desirable, both for ease and economy of coating, to deposit extremely lightweight or thin coatings and at critically defined predetermined regions only.

In diapers or napkins, for example, such light coat weights provide for a soft feel to the lamination; yet at the same time, with select portions only so coated, maintain open voids which permit both fluid and air to pass as required in the final product design. In addition, improved strength of the lamination is obtained through a large adhesive-coated surface area. Low coat weights, however, are very difficult to apply by conventional roll coaters and slot nozzles, such as those described, for example, in my earlier U.S. Pat. Nos. 3,595,204, 4,020,194, 4,476,165, especially in the case of substrates which do not have homogeneous or uniform surfaces, or possess limited thermal stability for coating, or where there are difficulties in processing a web material containing caliper variations many times greater than the fluid coating thickness. Typically, for example, a slot nozzle can apply coat weights to non-woven materials and plastic films and some paper substrates to 5 grams per square meter (GSM), but only under controlled conditions. Coat weights less than 5 GSM are generally applied through spray techniques. The light coat weight application of hot melt to fluff pulp, and a subsequent lamination to the tissue over-wrap of a diaper, for example, provides for improved lateral and longitudinal integrity and strength, thus improving the resistance to fluff balling in the baby diaper crotch area.

Underlying the present invention is the discovery of a technique for extrudingly spraying even lesser weight coatings of hot melt or other adhesive (say below 0.8 GSM), and in precise locations and contours, both intermittently and continuously.

In baby diaper and feminine napkin products, this offers an improved product design and physical softness. With this discovery, the adhesive is sprayed as fine fibers or filaments, with flexibility for combining with droplets or restricting the spray thereto, where required—but all with a controlled, sharp and precise pattern and position on the web, with the process continuous or programmably intermittent. This means that a product can receive continuous longitudinal filament application, a programmable intermittent ON/OFF repeat pattern, a series of filament applications adjacent to one another or staggered, and combined programmed intermittent and continuous application. Typically, a baby diaper or feminine napkin product can have continuous filament application on the left and right sides of the finished product, such as 0.5 to 1 inch in width, with intermittent filament application at the respective ends, yet located between the continuous left and right side patterns. The uncoated area in the center of the finished product can remain uncoated for the fluff or other customer product design requirement. The fluid application of the invention, moreover, will be of considerably less coat weight than that accomplished today by conventional methods before-described.

There are, of course, also applications for the invention other than in the disposable diaper or sanitary napkin product industry. Products such as tapes used in the medical industry require adherence to the human skin, and must have breathability. Laminations of non-woven-to-tissue or other combinations of substrates required in the textile, automotive, flexible packaging and medical industries, can also utilize the filament adhesive applicating process herein. The invention is also suited to special applications involving product assembly filament-bonding of substrates that are thermally sensitive to direct coating processes.

While hot melt adhesives have been described specifically above for illustrative purposes, the invention is also useful for the application of room temperature liquids which are at least somewhat viscous and difficult to apply by conventional roll coaters or even slot nozzle methods, but which can be successfully applied by the filament applicating system herein. It is also possible hat multiple component coating materials classified as ross-linking catalytic types can be mixed within the filament applicating head and applied to a substrate. Such materials work best when mixed within the applicating apparatus. As an alternative process to such mixing systems, moreover, the invention permits one to employ also two separate filament applicating systems, in which a coating is deposited upon a coating such that there is intermixing of the coatings on the surface of the web substrate, as later described in detail, including, for example, a base coating material such as conventional pressure-sensitive liquid adhesive from one applicator and a cross-linking activator, such as a photo-initiator from the other applicator, or another pressure-sensitive liquid adhesive of different properties, to provide strong or weaker adhesives.

In the case that the multi-layer deposit of such materials does not provide natural or sufficient inter-mixing, moreover, there is also the opportunity to interject and intersect the fluid streams of two separate filament applications with each other, thus causing improved or homogeneous intermixing prior to contacting the web substrate, as also later described.

Among the generic features attained by the controlled spray technique of the invention, even across wide webs of ten centimeters or more, are:

(1) a uniform coating weight distribution across the web;

(2) synchronous coat weight applied to web speed;

(3) well-defined outside edges of application pattern;

(4) intermittent coatings consisting of start and stop, with defined patterns at both the start and stop application; and (5) control of over-spray, which would result in adjacent apparatus being coated with adhesive cobwebs and particles.

An object of the present invention, accordingly, is to provide a new and improved somewhat-to-highly viscous fluid extruded spray application method and apparatus that enable extremely lightweight hot melt adhesive and other coatings in a variety of controlled forms ranging from fibers or filaments to droplets, and combinations of the same.

A further object is to provide an improved controlled fluid spray application technique and apparatus of more general utility, as well.

Other and further objects will be explained hereinafter and are more fully delineated in the appended claims.

In summary, from one of its broader aspects, the invention embraces a method of controlling the generation of somewhat-to-highly viscous fluid fibers, droplets and combinations of the same, that comprises, spraying a stream of such pressurized fluid through a fine orifice and along a predetermined direction in free flight, and simultaneously funneling a cone of pressurized air symmetrically about and against said stream, intersecting the same in its free flight below said orifice to control the nature, dimensions and pattern of the resulting fluid coating on surfaces disposed therebelow. Preferred apparatus and best mode embodiments and details are hereinafter detailed.

The invention will now be described with reference to the accompanying drawings, FIG. 1 of which is a longitudinal section of the preferred spray valve and nozzle apparatus of the invention operating in accordance with the method underlying the same and with various air control flow paths shown in different shadings;

Figure 8A:
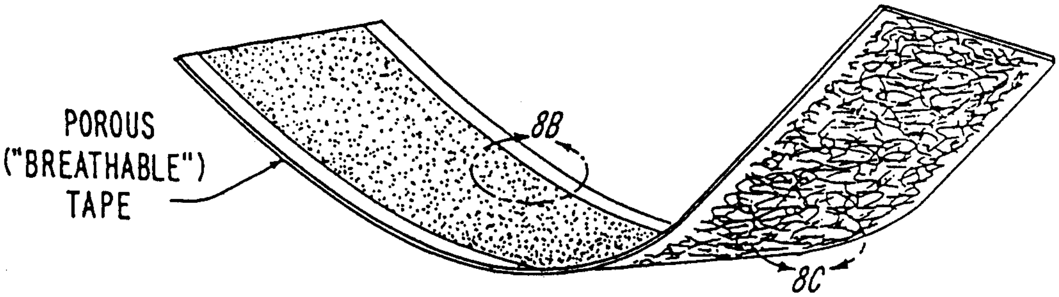
Figure 8B:
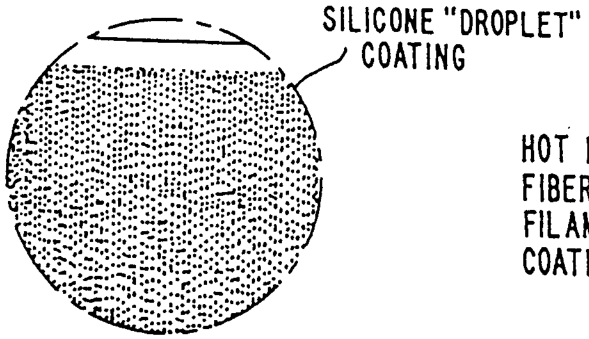
Figure 8C:
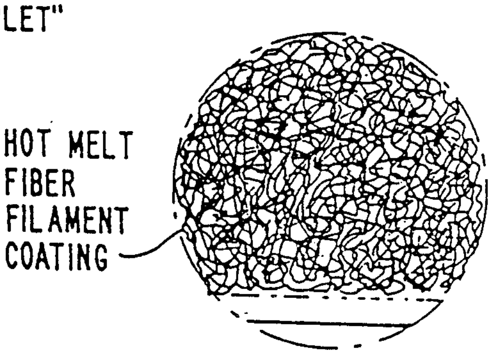
Figure 2A:
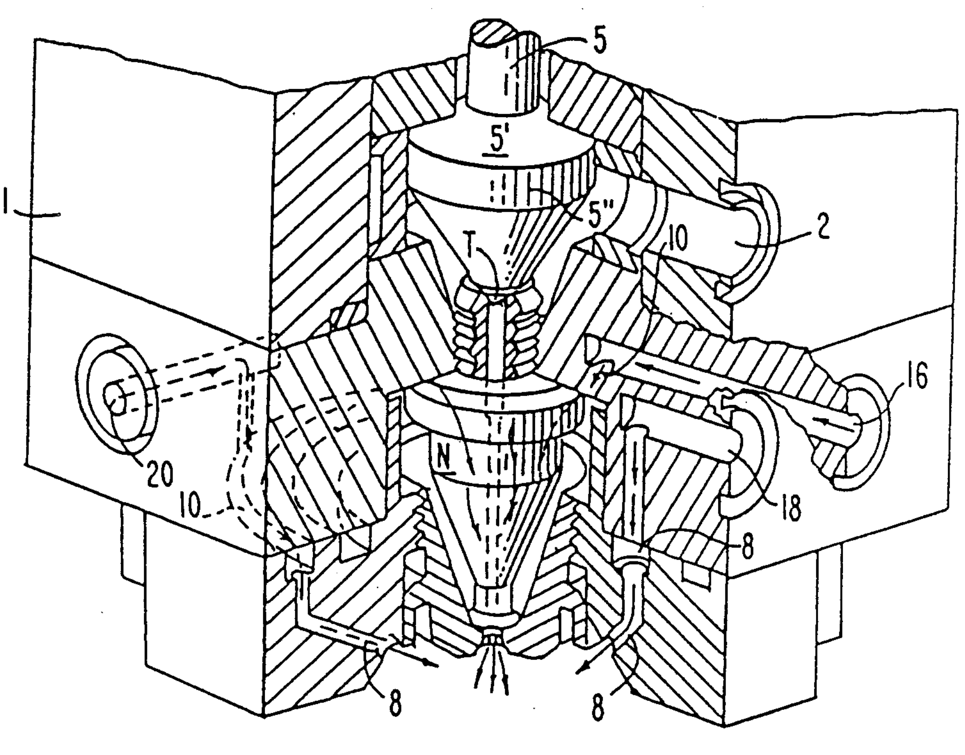
FIG. 2A is an isometric, broken away.

FIGS. 7A-D are views of contoured diaper patterns, continuous and intermittent, obtainable with the invention;

FIG. 8A-C illustrate a medical tape application of the invention; and

Figure 9:
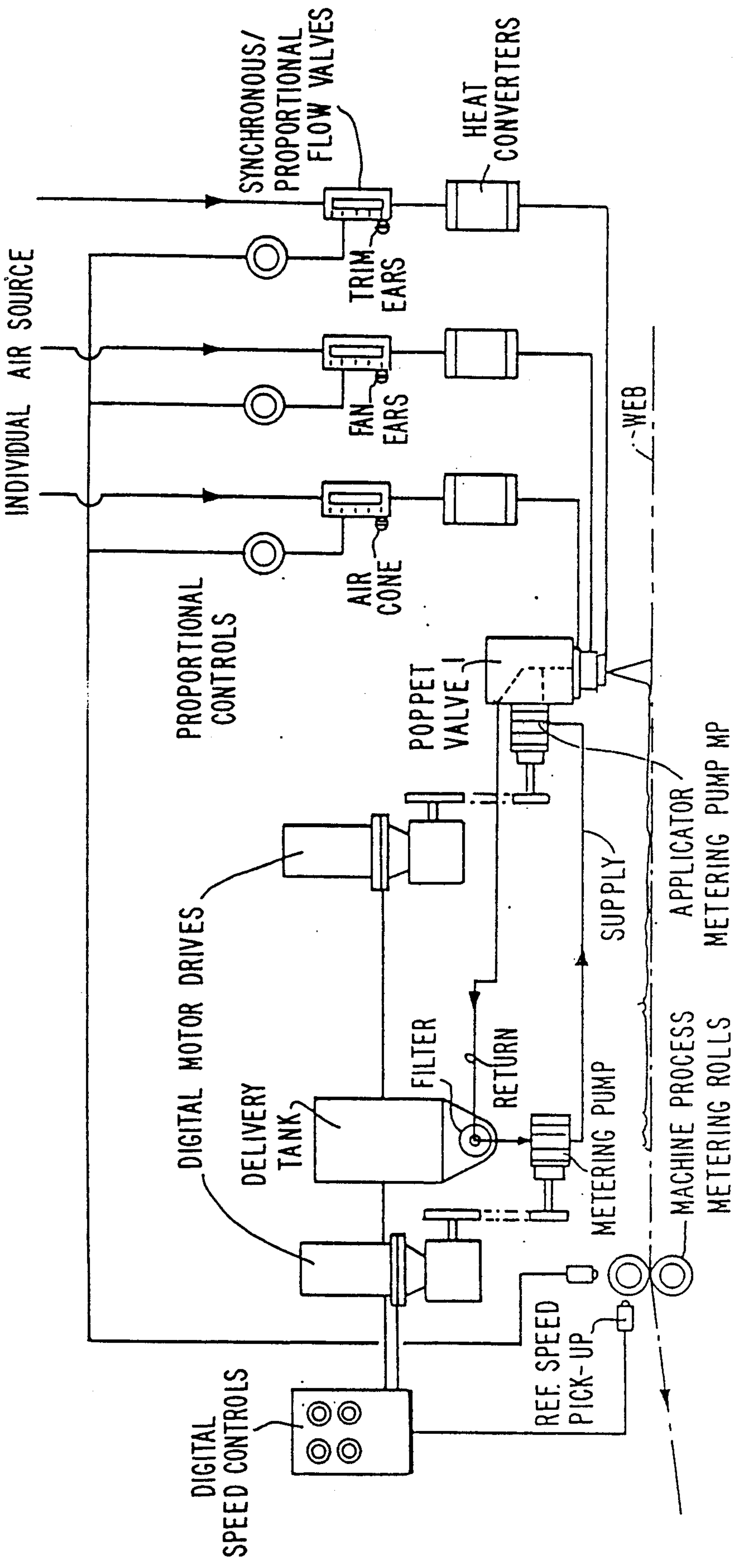

FIG. 9 illustrates a detail of preferred adjacent nozzle and metering pump positioning.

Figure 1:
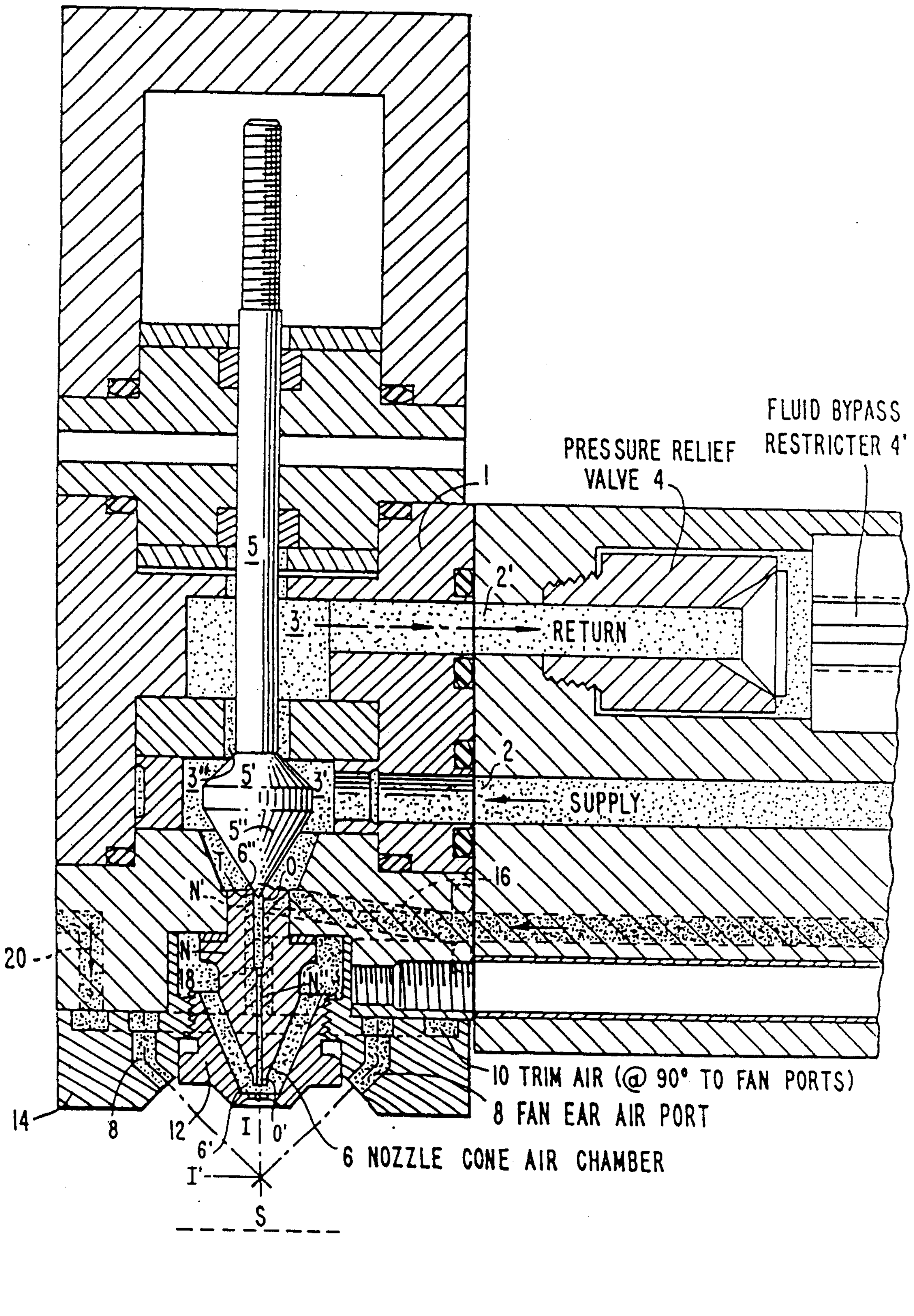

While several types of fluid spray applicators may be utilized to practice the method of the invention, the same is described herein in connection with a three-way poppet valve-controlled fluid nozzle or applicator 1, FIG. 1, as of the type described in my prior U.S. Pat. No. 4,565,217, though of significantly modified design. The valve housing contains lower and upper fluid chambers 3' and 3, respectively connected with a pressurized and metered fluid supply inlet line 2 and a return or exit line 2' shown preferably provided with a pressure relief valve fluid bypass restricter assembly 4-4', with the relief valve preset to a higher relief pressure (say of the order of 300 PSIG) and the orifice/fluid restrictor providing compressibility matching the resistance to flow by the fluid nozzle N communicating with the lower chamber 3'. Such a structure enables substantially instantaneous start and stop fluid flow patterns at low fluid displacement rates as the axial longitudinal valve stem 5, with its upper and lower converging valve sections 5' and 5'', reciprocates. Such reciprocation is between seating of the upper section 5' in a valve seat 3'' at the bottom of the upper chamber 3 while opening the tip T of the lower valve section 5'' above the nozzle top orifice 0 (causing fluid supplied to the lower chamber 3' to exit through the nozzle N), and an open position of the upper valve section 5', as shown, which exits the fluid supplied to the lower chamber 3' through the upper chamber 3 and the return line 2' (closing off fluid feed to the nozzle N by entry of the tip T into the upper nozzle opening O).

Unlike the poppet-valve nozzle assembly of my said earlier patent, the fluid nozzle N comprises an insert N' having the before-mentioned upper opening O preferably of carbide construction to serve as an effective wear surface for the reciprocating valve tip T. The insert N' directly communicates with a hollow needle-like tube or section N'' (such as a hypodermic needle) of smaller diameter than the insert, and having an opening(s) O' at its lower tip region for extruding a spray of the fluid passed from the supply chamber 3' when the stem 5 is in its upper position. As an example, the insert opening 0 may be of the order of 0.75 mm in diameter, and the needle tube N'' may have a lesser inner diameter of about 0.35 mm. It should be noted that the fluid nozzle N (N'—N''—O') is shown preferably, though not t essentially, in conical form with the nozzle orifice O' at the converged apex of the cone and is directly embedded in the base of the poppet-valve fluid supply chamber 3' for normal direct contact with the poppet valve stem tip T, as distinguished from remote fluid nozzle location separated by an intermediate fluid discharge plate as taught in my said earlier patent. This has been found advantageously to obviate the additional capacitance residing in the remote nozzle positioning which causes relatively heavy droplets of fluid to be deposited upon the moving web or other surface drawn past the nozzle N and represented at S, when the valve is closed. This valve tip design, moreover, has been found to minimize the driving of additional fluid through the nozzle during the closing action as is otherwise caused when high reciprocation rates induce a "fluid column" effect. The short distance between the open tip T, say of 45° convergence angle, and the insert opening O provides sufficient capacitance to absorb any such effect, and the hardness of the carbide insert N' resists change in physical shape during impact/reciprocation against the fluid nozzle, obviating the possibility of additional fluid displacement, particularly with short valve stem strokes of the order of 0.5 mm that minimize additional displacement to an acceptable level.

As earlier described, the invention provides for a highly effective control of the fluid stream sprayed out of the fine nozzle opening(s) O', in terms of the nature of the deposit on the web or other surface S moving past the nozzle and the location and contour of the same, by utilization of novel air-shaping, fanning and trimming and deflection.

Referring again to FIG. 1, an extension to the poppet valve assembly 1 is shown located at the same bottom end as the fluid nozzle location, providing for multiple air supply inlets. This extension may accept up to three separate air supplies, all directed upon the fluid after it has extruded from the nozzle and is outside the same, and which are designated as:

(A) a nozzle air-cone ear 6 in an insert 12 surrounding the converging nozzle housing N;

(B) supplemental fanning ears 8 at a pair of diametrically opposed regions external to the cone; and (C) supplemental trim ears 10 disposed ninety degrees in circumferential spacing from the fanning ears.

Turning first to the nozzle conical air control of the spray, air enters from supply line 16 into a conical annular chamber 6 in the insert 12 which coaxially surrounds the conical fluid nozzle housing N. The internal shape of the nozzle air cone chamber 6 can have the same angle or shape as the fluid nozzle, or a slightly different angle or shape. The lower air exit aperture opening 6′ of the chamber 6, furthermore, is preferably narrowed to be smaller in diameter than the inside diameter of the cone chamber shape at the aperture location, say of the order of 1.5 mm in diameter, with a taper so as to provide for a non-obstructed surface area to the path of fluid displacement. The air inlet supply 16 is fed into two ports 6″ located at the entrance to the nozzle cone chamber and positioned 180° opposite one other, FIG. 2, for uniform pressure drop within the chamber, with the result of providing uniform air velocity at the exiting aperture or opening 6′ for funneling a cone of pressurized air symmetrically about and against the spray stream at I in free flight below the nozzle opening O′. The internal conical annular air chamber shape and dimensions are slightly larger than the external dimension of the fluid nozzle housing N, as shown; and by changing the relative dimensional clearance between the fluid nozzle and the nozzle air cone chamber walls, as by threaded adjustment upward or downward of the insert 12, this can increase or decrease the relative air velocity passing through the assembly. The nozzle cone chamber aperture or opening 6′ is thus adjustable to permit the fluid nozzle tip position at O′ to remain recessed, FIG. 3A, or in the plane of or flush, FIG. 3B, or extended beyond the exit or outside surface of the nozzle conical air chamber, FIG. 3C, for purposes later explained. The nozzle insert member 12 may contain external threads and positioning pilot for obtaining the desired chamber position relative to the fluid nozzle tip.

Figure 6:
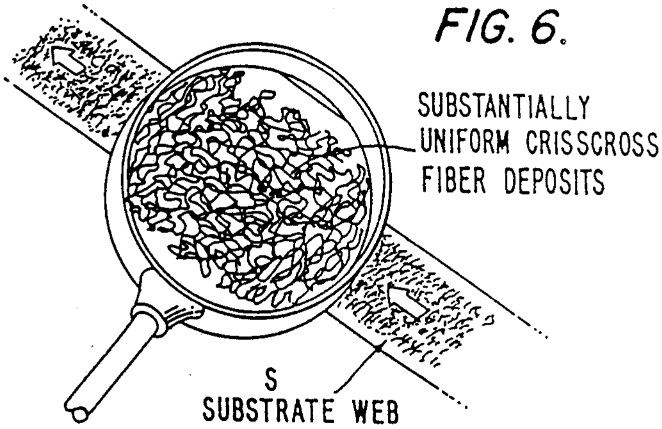
FIG. 6 shows the type of criss-cross fiber filament pattern attainable with the invention.
Figure 7A:
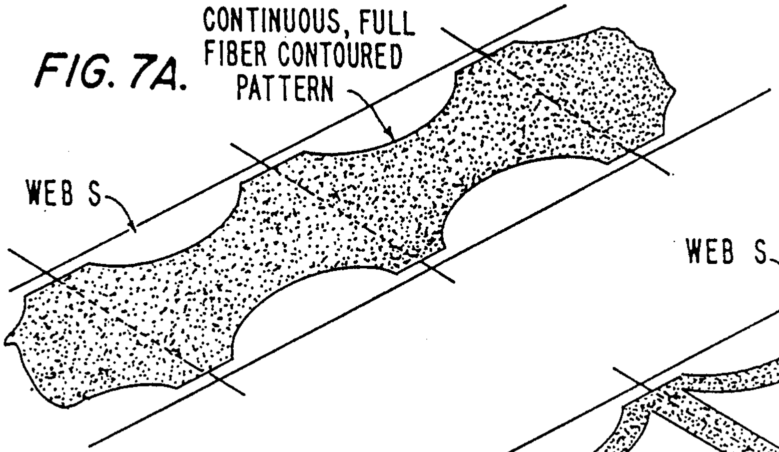
Figure 7C:
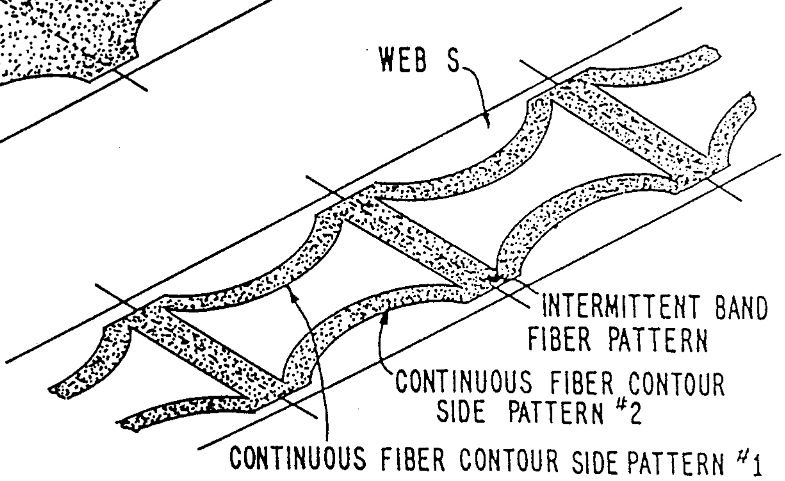
Figure 7B:
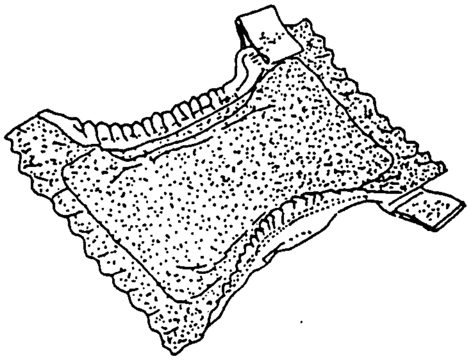
Figure 7D:
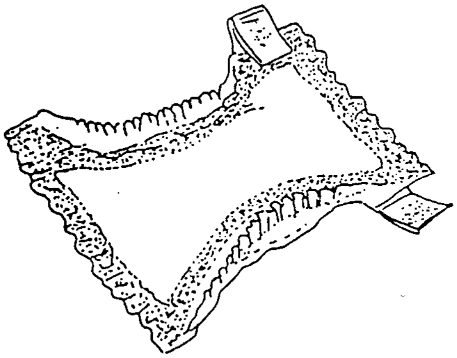

It is important for attaining the advantageous results of the present invention, that the conically directed air be funnelled to intersect the fluid spray in free flight below and outside the nozzle opening O′ as at I, FIG. 1, after the fluid has been extruded from the nozzle, and that the air not contact, deflect, centrifuge or otherwise interfere with the longitudinal axial extrusion path of the fluid through and out of the nozzle. It has been found that the position of the cone of air will then determine the style and type of coating patterns of fluid displacement from the fluid nozzle. As an example, with the nozzle conical air chamber positioned so that the fluid nozzle tip is recessed inside the internal aperture opening 6′, FIG. 3A, the extruded spray particles will bond or stretch outside the nozzle into continuous lightweight fibers or filaments, as earlier explained, and of extreme thinness of the order of 0.01 mm and less. These thin filaments are produced and deposited randomly but criss-cross, FIG. 6, for a recessed position R, FIG. 3A, of the previously stated dimensional nozzle structure, of about 0.457 mm, and the deposit is of substantially uniform filament population without gaps or variations in filament coverage density. The latter substantial uniformity result, FIG. 6, is believed, as hereinafter explained, to be largely attributed to the synchronous volumetric fluid extrusion and synchronous volume/velocity air flow -to- process speed used with the invention. This feature also produces markedly improved operation in other types of filament-generating systems, as well. The compressive fluid, in extrusion, expands as it exits and breaks away from the nozzle tip, and the air draws or stretches the free flight fluid into continuous filament form. Through the relative adjustment of the nozzle and the conical air chamber position to bring the fluid nozzle tip to substantially the same plane as, or flush with, the aperture 6′, FIG. 3B, the coating patterns will contain a combination of filament-fibers and small fluid droplets. Further adjustment to provide for fluid nozzle protrusion or extension E beyond the internal aperture opening 6′, say of the order of 0.457 mm, has been found to produce predominantly droplets or globules, with ever-increasing droplet size with increasing protrusion E, FIG. 3C.

Fanning ears may also be employed as before explained, with air entering at 18 into an extension member 14 joined with the insert 12 and with the air exiting through two external air jets 8. The air jets 8 are shown positioned diametrically opposite one other, FIG. 2, with the direction of air discharge designed to intersect below the external surface of the nozzle air cone chamber at I′—say about ¼″ below. For this purpose, the ears 8 are downwardly and inwardly bent toward one another, as shown. The purpose of the fanning ears 8 is to split or fragment the fluid ejecting in free flight from the fluid nozzle, as acted upon by the nozzle cone of air. The splitting or fragmentation of the fluid stream will distribute the fluid over a wide area, greater in size than that achieved when only the cone of air is used. Increased volume of air for fanning provides for wider coatings; whereas low volume will provide narrower coating widths. For the recessed position of FIG. 3A, while the cone of air intersecting the spray in flight at I provides initial filament formation from the main fluid spray stream discharging from the fluid nozzle O′, as earlier described, the introduction of the fanning air, uniformly on each side, provides for a further distribution of the filaments without fracturing them back into droplets. When the fluid nozzle position approaches or extends beyond the nozzle cone exit surface 6′, FIG. 3C, droplets or fragmented fluid filamentation occurs and the fanning air will only distribute the fluid in the form developed by the conical air.

Figure 2:
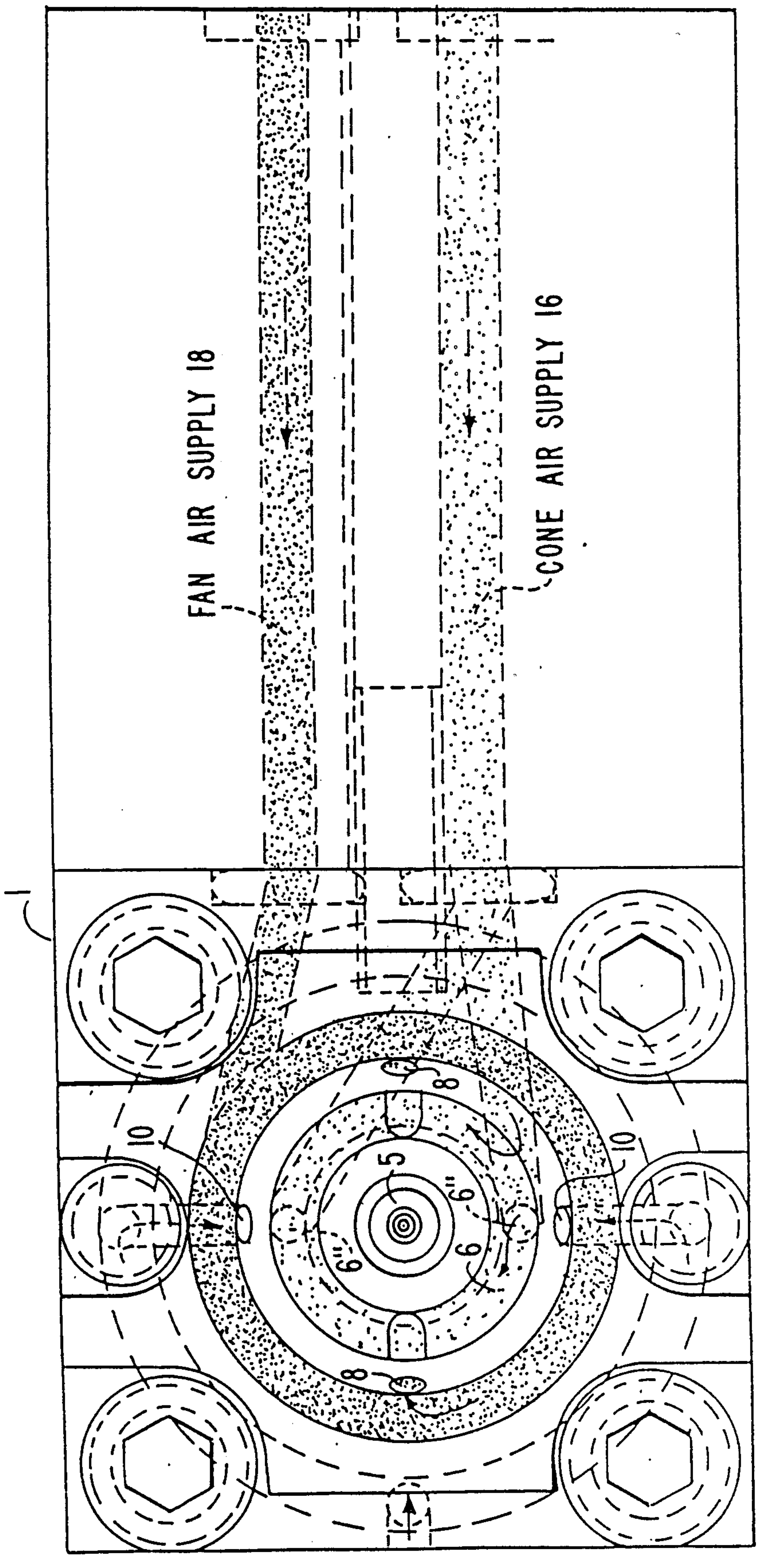
FIG. 2 is a top plain view of the lower portion of the system of FIG. 1, showing also the air control flow paths in different shadings.
Figure 3A:
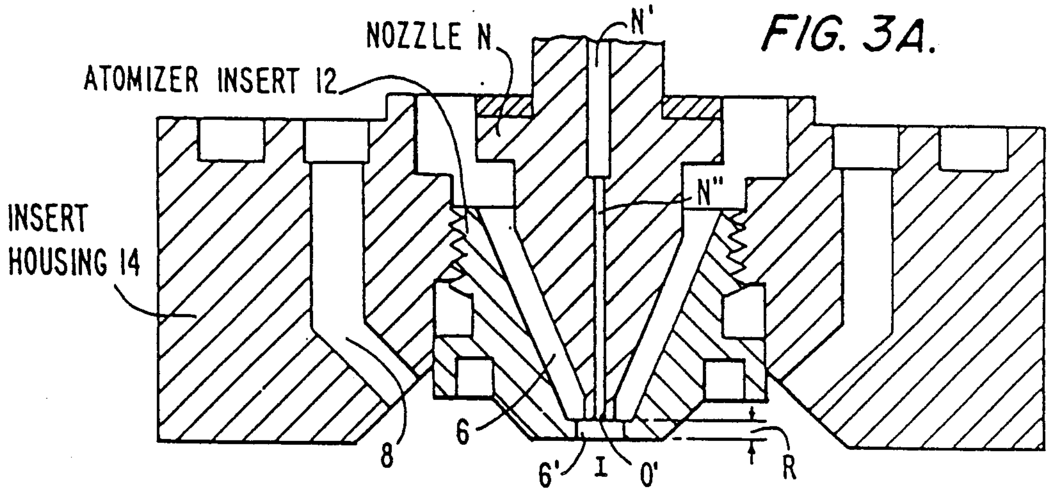
FIGS. 3A-3C are fragmentary longitudinal sections of the fluid nozzle and air control portions of the apparatus of FIGS. 1 and 2 for recessed, flush and extended nozzle positions, respectively.
Figure 3B:
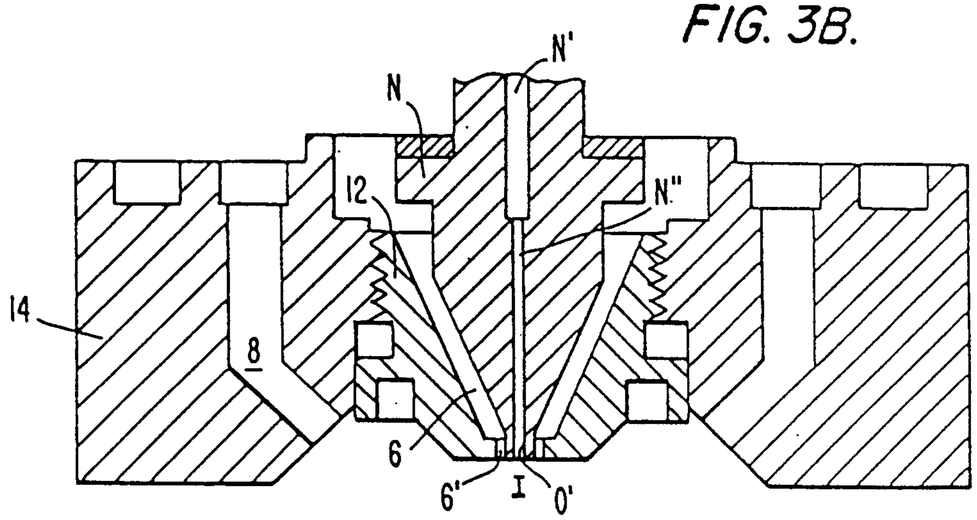
Figure 3C:
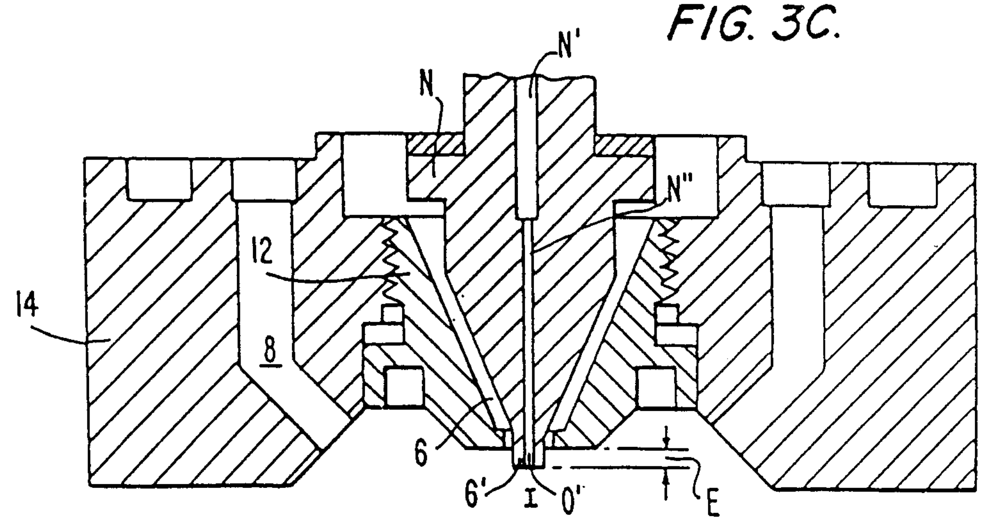

If desired, trimming air may also be provided, as previously mentioned, entering into the same extension member 14 from inlet 20 and exiting through an additional pair of 180°-opposing ears 10 of the same design as the fanning ears, but displaced circumferentially 90° to the fanning ears, FIG. 2, 2A. The function of the trim ears is to contain the fluid distribution from the fanning ear process, so as to provide for a more contained fluid pattern distribution and controlled pattern width. Increased trim air will cause a reduction in overall coating pattern width; whereas little or no trim air will have minimal or no effect upon the pattern width. A programmable cyclic volume variation of air supply to the trimming ears can provide an "hour glass" shaped pattern, if desired, FIGS. 7A–D, which can be registered to the finished product, such as a diaper or sanitary napkin, thereby causing change in pattern width from wide to narrow to wide, as required. For diaper or similar application, the adhesive application may be laterally shifted to follow the cut contour shape of the diaper as in the continuous full fiber contoured pattern of FIG. 7A, resulting in the finished product of FIG. 7B. Two applicators may be employed, one on the left side and one on the right, simultaneously signalled to shift the coating pattern to follow the contoured shape of the diaper. Alternative continuous fiber contour longitudinal side patterns of "hour glass" shape may also be produced with the intermediate space uncoated, FIG. 7C, and with intermittent transverse fiber stripes or bands with sharp cut-on and cut-off coating edges produced at high diaper line speeds, enabling the finished product of FIG. 7D. The intermittent adhesive application, furthermore, permits the diaper maker to program the application of adhesive throughout the diaper construction. Similarly, if one of the two exit ports from the trim ears is blocked, thus permitting only one ear to be used, a deflected or wavey coating pattern can be produced when the supply air is cyclically introduced. Other balanced or unbalanced deflection effects can similarly be introduced.

Figure 4:
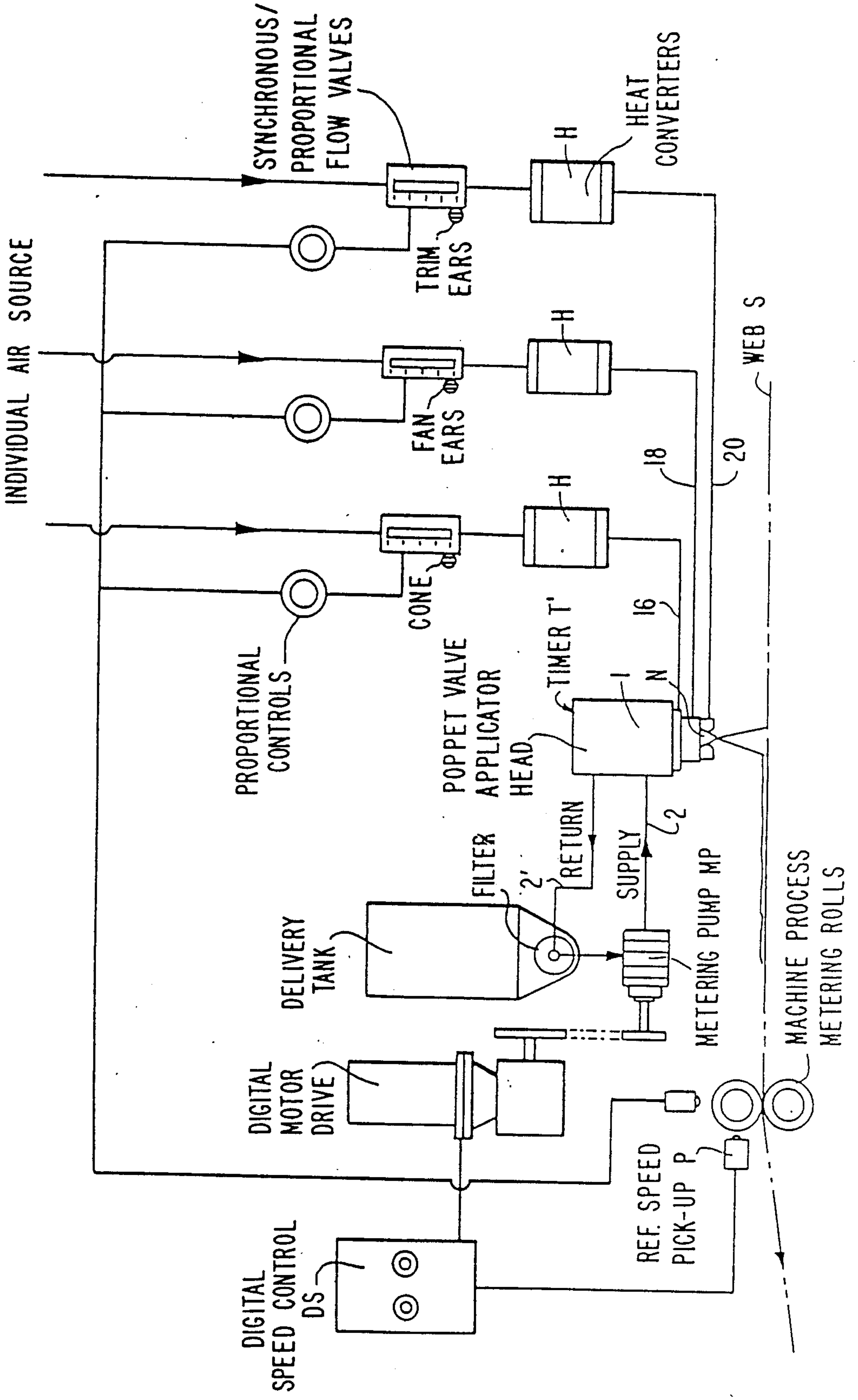
FIG. 4 is a separate block diagram of the system for operating the apparatus of FIGS. 1-3C.

Prior fluid spray systems have been designed to operate at a fixed web speed, or a narrow range in speed change. This means that during speed ramp-up of a process, the fluid application is not applied until speed limits are reached, with the result that large quantities of scrap web material are generated at speeds less than the set limits. The present invention has no such limitation, with its air flow devices interfacing synchronously with the fluid supply applicator and the establishing of predetermined rate ratios of fluid and air, synchronous with web line speed. A typical system for producing the fiber-filament and/or droplet array results with the apparatus 1-N-6, etc., of the invention with such synchronization, is shown in FIG. 4. Tests have confirmed that the volume of air required for each of the supply inlets to the respective air cone, fanning and trim systems is linear, with a proportional slope, to line speed, separate proportional ratio controls and synchronous proportional flow valves for each being so labelled in FIG. 4. The individual air requirements for the air cone, fanning and trim are, however, not necessarily of the same value for any given set of operating conditions. A programmable air flow valve system is, therefore, used, FIG. 4, for obtaining linear, yet proportional, air flow supply to each of the three ear inlets 6, 8 and 10 in the poppet valve assembly. As before stated, the air supply to the trim ear zone can be made to operate in a cyclic manner, so as to produce the before-mentioned useful "hour glass" shape pattern, or other patterns as desired. In addition, an electronic timer system T', operating conventional electric solenoid air valves, not shown, as described in said earlier poppet valve patent, for example, signals the poppet valve assembly to reciprocate the poppet valve stem 5 for obtaining intermittent, yet programmable, predetermined coating pattern lengths. The motor drive for controlling the fluid metering pump to the supply line 2, so-labelled, is controlled by the digital speed control DS that receives web line speed information from pickup P.

It is important to stress that to obtain consistent fluid coating pattern widths synchronous in coat-weight and fluid distribution width, both continuous and intermittent patterns must have simultaneous proportional, yet synchronous, air displacement for the air supply. Fixed or non-proportional air supplies will cause pattern width and coating weight distribution changes, which are inconsistent with coating patterns obtained by the synchronous/proportional fluid and air supplies of FIG. 4. It has further been determined, moreover, that all air supplies should be heated either to the same temperature or a temperature somewhat higher or lower, for obtaining consistent fluid filament depositions onto a web. Individual heat converters, such as electric heat elements, preferably peripherally positioned around the radial air passageways, are schematically shown for each air supply at H in FIG. 4. The heat converter H may contain a series of longitudinal holes or passageways, radially oriented for transfer of heat into the moving air. It is important, furthermore, that the air supply temperature be maintained with close tolerance in order to insure that the fluid application environment does not vary with web speed. Loss of air temperature will cause accelerated cooling of the fluid filaments, which will result in pre-solidification of the coating material before contacting the moving web S. In such cases, angel hair or cobwebs of solidified fluid are observed and cling to adjacent apparatus, resulting in loss of production efficiency and product quality. Microprocessor temperature regulation of the heat converters is used preferably in conventional fashion for maintaining close tolerance temperature control throughout the air chambers with air volume, synchronous to machine speed, as monitored by the line-speed pick-up P. Likewise, the fluid filament applicating system is temperature controlled, thus insuring that the control of the fluid exiting the fluid nozzle N is at a predetermined temperature irrespective of fluid volume displacement. The fluid displacement metering system must be synchronous, yet proportional, to line speed in order to provide close tolerance quantity of fluid rate, in which the rate of displacement is predetermined and synchronously in balance with the volume of air supplied to the nozzle cone, fanning and trim ears.

The invention, moreover, permits the application of low coat weights of contemporary hot melt adhesive products, for example, as described in said patents, in continuous and intermittent programmable patterns of filament application to web substrates at speeds of, for example, up to 300 diapers per minute, or 136 meters per minute (450 feet per minute) and higher. Typical substrates or webs or surfaces S are low density polyethylene, polypropylene, polyvinyl chloride, materials with extreme thermal sensitivity, and breathable fabrics, including spun-bonded or thermal bonded polypropylene and other non-woven materials.

As before mentioned, the accurate positive displacement metering pumps, FIG. 4, preferably adjacent the nozzle head 1 as later more fully discussed, enable precise fluid displacement through the small orifice nozzle N, with the multiple air supplies introduced into the chamber surrounding the extrusion nozzle stretching and bonding the fluid spray particles into continuous monofilaments or fibers, where desired. The discharging air thus causes the fluid to form such nondescript lateral crisscross fiber deposits onto the moving web S, FIG. 6. For improved fiber or filament application purposes, furthermore, it has been found significantly advantageous to locate the positive displacement metering pump MP, as more clearly shown in FIG. 9, closely adjacent to the poppet valve head. This results in limited fluid capacitance, the fluid channel being made short in length, say 10 cm or so, to the head 1. Fluid capacitance available in flexible heated hoses of prior systems causes non-synchronous fluid application, due to the relatively long distance between metering pump at tank delivery to the coating applicating station; and the adjacent location of the metering pump and nozzle mitigates against such effects. The adjacent metering pump location feature also introduces improved operation in other types of fluid fiber or filament generating systems, as well.

The condition of the adhesive extrusion rate being synchronous to machine speed, as before described, as well as the air supplies, maintains the same or substantially uniform coating distribution throughout the process. The nondescript lateral crisscross fiber or filament deposits easily accommodate coating of open and breathable fabrics such as the said non-wovens, wherever required, yet minimize thermal shock due to the hot coating deposited from the non-contacting applicator system N.

Typically, for hot melts, application temperatures are 125° C. or lower in order to minimize the potential thermal shock, yet maintain continuous filament extrusion. Higher temperatures, such as 150° C., are acceptable for many substrates where open time is required for obtaining satisfactory lamination of substrate materials. Each filament applicator, for example, may provide application widths ranging from about 6 mm to 38 mm. Coating weights applied for the above pattern widths may be 10 mg to 50 mg per 45–50 cm length of product, and coat weights as low as 0.2 gms per SQM have successfully applied. Also, the accuracy of the coating weight has been found to be held to within 5%, plus or minus.

In FIG. 8, the filament or fiber process of the invention is illustrated as applied to a "breathable" bandage strip or medical tape, having silicone radiation-cured (UV or EB) deposited as droplets on one side (globules of about 1 gm/SM, for example) and the fibers on the opposite side, as of 45 mg/45 cm of adhesive pressure-sensitive material.

Finally, one of the most interesting advantages of the system, compared to contemporary slot nozzle coating or multiple fine line bead applications used in the diaper industry, is the adhesive cost savings. Typically, a 50% saving is possible utilizing the invention without sacrificing structural bond strength. Annual adhesive cost savings can approach $100,000 per diaper machine. With no "over-spray" waste, in addition, trim generated by the contour cutting of diapers and special shapes of feminine napkins can now be fully reclaimed without adhesive contamination. Up until now, the trim has been considered scrap; therefore, non-reclaimable and an added cost to the overall manufacturing process.

Figure 5A:
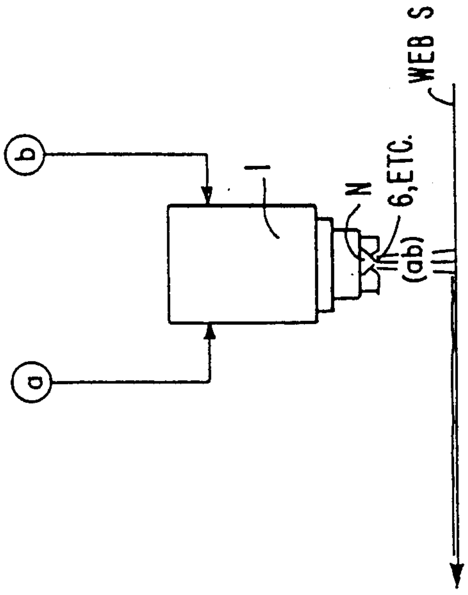
FIGS. 5A-5D are schematic diagrams of multi-component fluid deposition systems achievable with the invention.

In the fiber or filament mode, particularly, the spray technique and control of the invention is also useful outside the field of hot melt adhesives and the like, as before noted. The fiber or filament applicating system can also be most usefully employed, for example, for application of room temperature cross-linking type fluids. Four exemplary types of such applications are shown in FIGS. 5A through D. In the embodiment of FIG. 5A, a two component fluid system is shown in which two separate fluid metering supplies a and b are used at equal or proportional ratios, and are combined or mixed internally within the fiber filament applicating head 1-N-6, etc. The process can result in fluid catalyst reactions, as a result of the mixing, but also may be further cross-linked by further exposure to ultraviolet or electron beam radiation curing.

Figure 5B:
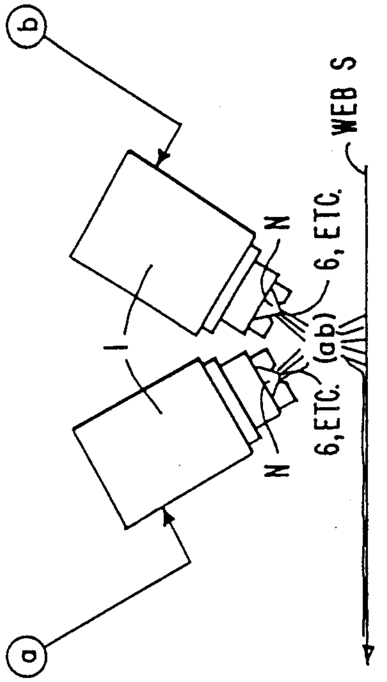
Figure 5C:
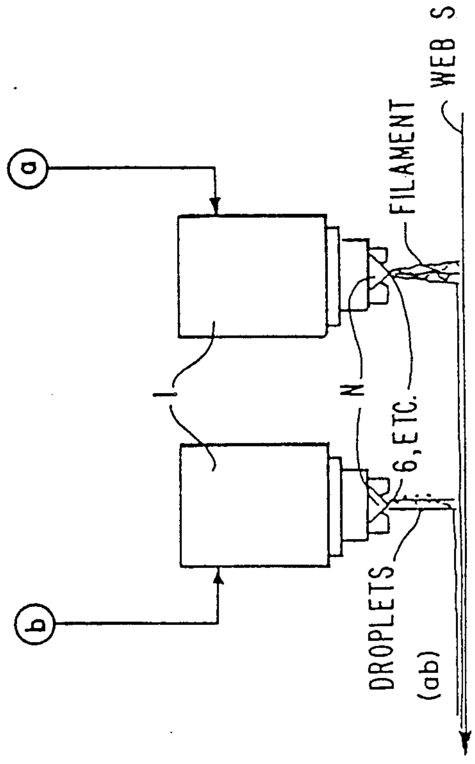
Figure 5D:
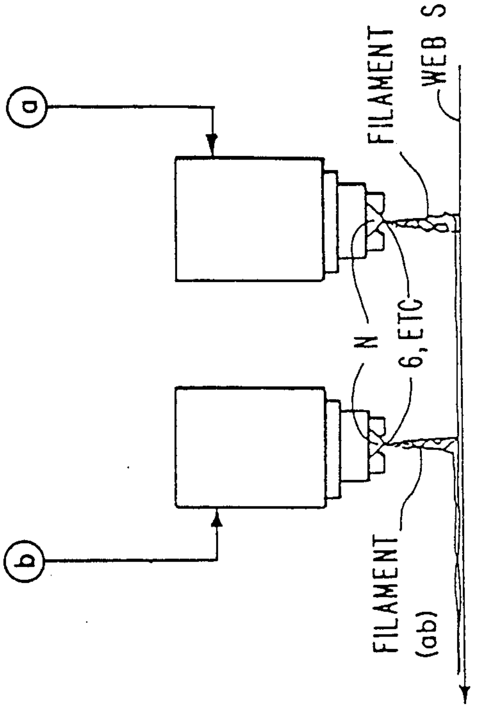

In the modification of FIG. 5B, another two-component system is shown in which the mixing of the components occurs externally, through the intersection of the two separate fluid streams a and b, as earlier suggested. The fluid streams originate from individual fiber filament applicating heads 1-N-6, etc., with the respective fluid flows directed towards an intersecting point which is located either above the coating web or at the junction of the web surfaces. In FIG. 5C, however, each component a and b is deposited upon a moving web, such that the second coating is deposited on top of the first coating. It is possible for one applicating head to apply a filament deposit, whereas the second may apply a non-filament droplet coating pattern. The droplet pattern, for example, will present an opportunity for coating of the filaments. In a two filament process, FIG. 5D, the fiber surfaces contact with one another only at the filament-intersection points. Radiation of the above can result in providing for full cross-linking of the two components into a solid state. It is possible that a synthetic fiber-like substrate can be produced in this manner, to simulate the process of making non-wovens.

Suitable two-component viscous fluids are, for example, pressure-sensitive liquid adhesives, such as the Dynamite Nobel (West Germany) No. 1530 adhesive with a photo-initiator such as the T.H. Goldschmidt No. A4 type, (lower viscosity range of about 500–5000 CPS). In the hot melt adhesive uses, suitable higher viscosity fluid coating materials include, for example, elastomeric rubber, acrylic, ethylene vinyl acetate, etc., hot melt, such as Findley Adhesives Company Type 990-374C, (of high viscosity ranges of about 5,000 to 50,000 cps at 150° C.). Uniform filaments of the order of 0.01 mm have been deposited in the controlled manner described even for wide line speed variations of from about 50 up to high line speeds of several hundred ft/minute and as high as 600 ft/minute (180 meters/minute), more or less.

Further modifications will also occur to those skilled in this art and such are considered to fall within the spirit and scope of the invention as defined in the appended claims.

What is claimed is:

1. A product having a substrate upon which a single continuous fiber has been extruded in a random nondescript laterally criss-cross pattern layer at each of selected regions thereof.

2. A product as claimed in claim 1 and in which the crisscross pattern layer provides for reinforcement of the substrate at such regions.

3. A product as claimed in claim 1 and in which the fibers are of hot melt material and the substrate is of diaper and/or feminine napkin material and the crisscross pattern layer is contoured at the selected regions including one of internal continuous pattern, contoured side pattern, and intermittent band pattern including transverse end stripes.

4. A product as claimed in claim 1 and in which the fibers are of hot melt adhesive and the crisscross pattern layer has been deposited in low coat weight of the order of a fraction of a gram to a few grams per square meter, and with the crisscross pattern layer providing adhesive holding power comparable to heavier full width coatings.

5. A product as claimed in claim 4 and in which the substrate is a tape.

6. A product as claimed in claim 4 and in which the substrate is a breathable tape or bandage and the said crisscross pattern layer is open or breathable.

7. A product as claimed in claim 6 and in which the substrate carries a breathable silicone pattern on the surface opposite the crisscross pattern layer.

8. A product as claimed in claim 1 and in which the substrate is at least one of breathable fabrics including non-woven porous sheets and tissues, impermeable sheets of polyethylene, polypropylene and polyvinyl chloride, and thermally bonded polypropylene.

9. A product having a substrate upon which multiple fluid components have been extruded, in at least some of which a single continuous fiber forms a random non-descript laterally crisscross pattern layer, said components being mixed for enabling at least one of catalytic reaction and cross-linking, including, if desired, subsequent radiation-induced cross-linking and curing.

10. A product as claimed in any preceding claim in which a member is secured to said substrate by said fibers serving as an adhesive connection between said substrate and said member.

* * * * *